Jan. 4, 1966  L. L. LOPER ET AL  3,227,788
METHOD OF INSULATING A PIPE ASSEMBLY
Filed Feb. 29, 1960  2 Sheets-Sheet 1
Fig-1
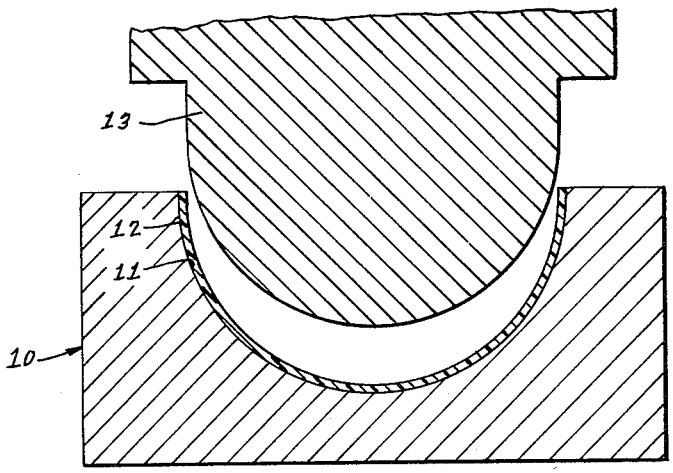
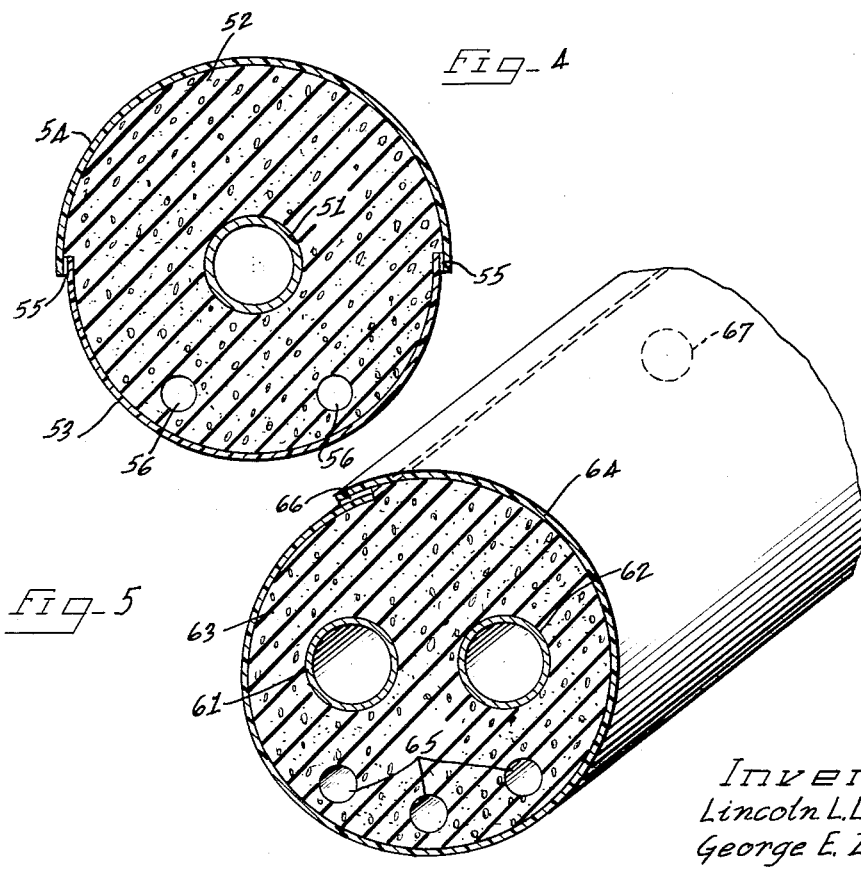
Fig-4
Fig-5
Inventors
Lincoln L. Loper
George E. Ziegler
by Hill, Sherman, Meroni, Gross & Simpson  Attys.

Jan. 4, 1966   L. L. LOPER ET AL   3,227,788
METHOD OF INSULATING A PIPE ASSEMBLY
Filed Feb. 29, 1960   2 Sheets-Sheet 2
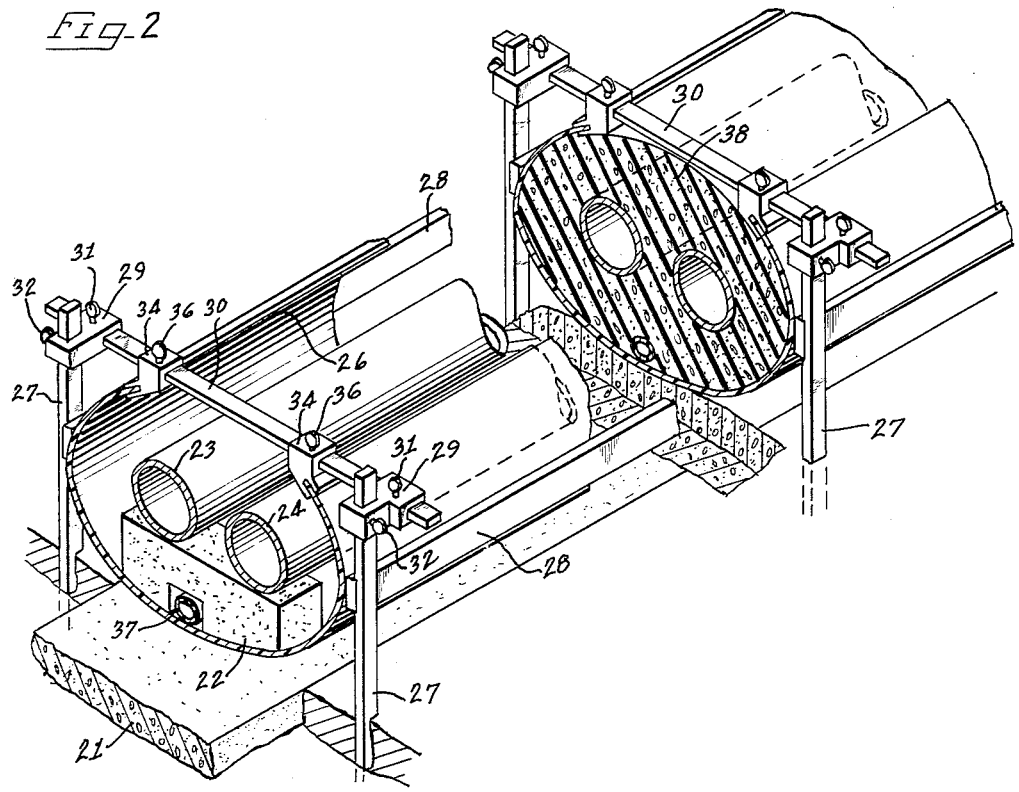
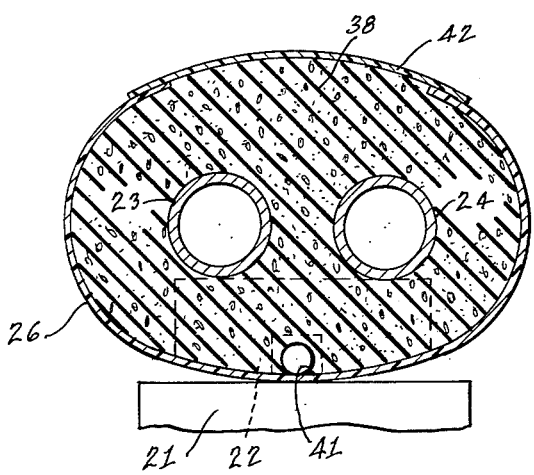
Inventors
Lincoln L. Loper
George E. Ziegler
Attys United States Patent Office 3,227,788
Patented Jan. 4, 1966

3,227,788
METHOD OF INSULATING A PIPE ASSEMBLY
Lincoln L. Loper, Bellevue, Wash., and George E. Ziegler, Evanston, Ill., assignors to Concrete Thermal Casings, Inc., Seattle, Wash., a corporation of Washington
Filed Feb. 29, 1960, Ser. No. 11,560
3 Claims. (Cl. 264—112)

The present invention relates to the thermal insulation of pipe assemblies and has particular reference to underground pipe installations which employ a monolithic mass to insulate pipes carrying heated or cooled fluids.

One of the most common systems employed for underground pipe installations involves the use of metallic casings about the insulation which surrounds the pipe. These casings are prefabricated in sections and welded into a continuous unit. However, field experience is showing that these metallic casing systems are progressively troublesome as far as moisture problems are concerned because corrosion of the casing in the soil results in pinhole openings in the casing that allow liquid water to enter the insulation. Despite this drawback, the metallic casing type of assembly is still considered by many contractors to be the standard. Accordingly, specifications for underground pipe installations frequency specify that the installation must be air testable, that is, capable of maintaining a specified air pressure within a given length for a designated period of time.

With this type of requirement in the field, it is important that a pipeline insulation installer be prepared to supply a system which meets these specifications. It would be even more desirable that the specification be met with an installation not requiring the use of a metallic casing and thereby eliminating some of the difficulties which have occurred in metallic systems. The satisfaction of that need is the principal object of the present invention.

Another object of the invention is to provide a method for achieving an improved underground pipe installation system employing lightweight, non-metallic insulating means.

Still another object of the invention is to provide a method for achieving an improved pipe installation system which can be easily fabricated on the job site.

Still another object of the invention is to provide an improved method for achieving an air-tight, air-testable covering over a monolithic embedment for pipe systems.

Other objects and features of the present invention will be apparent to those skilled in the art from the following description, taken in conjunction with the attached sheets of drawings.

The present invention makes use of an air-tight, synthetic resinous membrane as a barrier for the monolithic embedment surrounding the fluid carrying pipes. Particularly good results have been obtained by the use of synthetic resinous compositions which employ glass fibers as a reinforcing medium. Some means of reinforcement are normally necessary to make most commercial resins applicable to our process, but there are some resins which have properties which make them useful, even without reinforcement. For example, newly developed polypropylene resins have tensile strength, stiffness, hardness, and resistance to chemical attack by the high pH of Portland cement water all sufficiently high to eliminate the need for reinforcement. Typically, such resins have a tensile strength of about 5000 p.s.i., a flexural strength of about 8100 p.s.i., a hardness on the Rockwell "R" scale of about 93 and an almost complete inertness to caustic.

Because of their relatively lower cost, however, we prefer to use glass fiber reinforced resins. Such resins are available in flat sheet form which can be curved and held in the desired oval, elliptical, or circular shape by suitable mechanical means. When flat sheets are employed, they should have a thickness of about 0.060 to 0.150 inch in order to function effectively.

In order to use thinner resin sections, we can employ a preformed material which is shaped into a self-sustaining form before it is applied to the pipe installation. Such preforms are relatively stress-free and even in very thin sections are capable of supporting substantial masses of freshly poured, but still unrigidified insulation. In the preferred embodiment of the invention, the preformed sections are employed as forms for receiving a poured, rigidifiable thermal insulation about the pipes while the form is braced against spreading. After the pouring of the mass, the entire unit can be sealed air-tight through a suitable adhesive or by means of specially designed closure members, as will be apparent from succeeding portions of the description.

Glass fibers have been used as reinforcement in a wide variety of resins. Generally, the glass fibers are supplied in the form of a light mat having the density on the order of one ounce per square foot. In some cases, the glass fibers are coated to improve the adhesion characteristics of the glass.

Experience has shown that it is highly desirable to protect the glass fibers from exposure to the high pH water of the Portland cement, where the insulating composition is in the form of a settable concrete. The fibers should be placed in the resin in a manner such that only a resinous surface is exposed to the cement water. A laminated structure in which an inner laminate protects the glass fibers meets this requirement. Some protection can also be achieved by coating the inner surface with a resinous or bituminous film.

One of the most important classes of resins in which the glass fibers are compatible are the polyester resins. Basically, these materials are polycondensation products of dicarboxylic acids with dihydric alcohols. They may be of the unsaturated or saturated type. The unsaturated polyester resins are formed by reacting a dihydric alcohol and a dibasic acid, either or both of which contain a double bonded pair of carbon atoms. The alcohol and the acid are heated to sufficiently high temperatures to react, split out water, and form ester linkages. The double bonds in the unsaturated polyester resin thus formed render the material capable of subsequent crosslinking which is generally accomplished by reacting the unsaturated polyester resin with a polymerizable monomer such as styrene under the influence of a catalyst such as a peroxide. In reacting, the double bonds of the unsaturated polyester resin connect with those of the monomer to form a thermoset resin which, when fully cured, is insoluble and infusible.

Typical dihydric alcohols employed for the manufacture of unsaturated polyester resins are ethylene glycol, propylene glycol, 1,3-butylene glycol, 2,3-butylene glycol, diethylene glycol and dipropylene glycol. The unsaturated dibasic acid is usually maleic anhydride or fumaric acid.

In addition to styrene, suitable monomers include diallyl phthalate, vinyl toluene, methyl methacrylate, or triallyl cyanurate.

Additional benefits are achieved if an activator or accelerator such as cobalt naphthenate, an alkyl mercaptan, or a dialkyl aromatic amine is employed.

Another class of resins which are readily combined with glass fibers are the epoxy resins. These resins are the condensation products of epichlorohydrin with diphenols such as bisphenol-A. These materials harden at room temperature or at elevated temperatures by reaction with a curing agent such as an amide, acid, or another resin. Epoxy-fibrous glass compositions are very strong mechanically, especially under the influence of moisture, continuous loads, and vibration. They also exhibit high dimensional stability. They have the disadvantage, however, of being considerably more expensive than other types of glass fiber reinforced resins.

The minimum thickness of the waterproof casing should be about 0.015 inch. From an engineering standpoint, there is no upper limit to the thickness but for reasons of economy, it is not necessary to exceed a thickness of about 0.075 inch. An average thickness for commercial installations is in the range from 0.040 to 0.050 inch.

Casings employed for the purpose of the present invention have a minimum tensile strength of 500 pounds per inch of width. They are stable at elevated temperatures and have less than 5% strength loss when exposed to 140° F. water for 1,000 hours.

A further description of the present invention will be made in conjunction with the attached sheets of drawings which describe several preferred embodiments thereof.

In the drawings:

FIGURE 1 is an exploded, cross-sectional view of a die molding assembly which can be employed to make the waterproof membranes of the present invention;

FIGURE 2 is a view in perspective of a pipe installation, with portions broken away for clarity, illustrating the manner in which the outer covering is applied to the insulated pipe assembly;

FIGURE 3 is a cross-sectional view of the completed insulated pipe assembly;

FIGURE 4 is a cross-sectional view of a modified form of pipe insulating assembly; and FIGURE 5 is a view in perspective of a still further modified form of pipe insulation assembly embodying the present invention.

As shown in the drawings:

In order to secure the maximum benefits of the invention, it is highly desirable to preform the synthetic resin into the arcuate sections required for enclosing a thermal insulation for pipes whether of the circular or elliptical form. The circular form is generally preferred for single pipes and the elliptical for a multitude of horizontally spaced pipes, since that form reduces the total amount of thermal insulation necessary, and also reduces the surface area of the waterproofing membrane required.

One means for preforming the membrane has been illustrated in FIGURE 1 of the drawings. This system employs a lower die member 10 having a molding cavity 11 of generally semicircular form. A mat of glass fibers impregnated with a liquid thermosetting resin, and identified at reference numeral 12 of the drawings is placed in the molding cavity 11. An upper punch member 13 is arranged to be received within the die 10, and to shape the glass fiber impregnated mat 12 by compression. The two die members 10 and 13 are preferably heated by means of steam jackets to temperatures on the order of 200 to 325° F. Upon removal from the die, the glass fiber mat with the resin cured in it is self-sustaining but still flexible enough to be shaped as required in the underground pipe installation.

Another, but less preferred method for providing the preform consists in applying a glass fiber mat onto a circular mandrel, followed by coating and impregnating the mat with the liquid thermosetting resin by means of a doctor blade. After the liquid resinous material has thoroughly impregnated the mat, the mat can be heated to cure the resin and provide the self-sustaining, curved sheet.

Still another method for forming the preform consists in heating a reinforced sheet and deforming it thermoplastically.

FIGURE 2 of the drawings illustrates the manner in which the resinous membrane is employed to provide a waterproof outer covering for an underground pipe installation. After a trench of suitable length and width has been dug, a concrete pad 21 may be poured in place at the base of the trench. Temporary support means such as spaced blocks 22 are then provided for supporting a pair of pipes 23 and 24 until such time as the pipes are completely surrounded by the monolithic embedment. The blocks 22 thereupon become part of the embedment surrounding the pipes.

A self-sustaining curved outer casing 26 is positioned within the trench to serve as a form for receiving the subsequently poured monolithic insulation. To position the casing 26, I may provide a series of posts or stakes 27 driven into the ground at spaced locations along opposite sides of the trench. The posts 27 are interconnected by means of bars 28 which serve to align the posts and to prevent them from tipping over. The bars 28 also provide lateral support for the form during the pouring of the insulation. A series of spreader bars 30 extend laterally between the stakes 27. The opposite ends of the bar 30 are received in clamps 29 and secured thereto by means of clamping screws 31. The clamps themselves are secured to the posts 27 by means of screws 32.

The casing 26, initially circular, is slit longitudinally and is distorted from the circular form into an elliptical or oval configuration by a pair of adjustably positionable slide bars 34 which are selectively positioned along the spreader bar 30 by means of clamping screws 36. The slide bars 34 have grooves for receiving the ends of the casing 26 and holding it in a predetermined position, as illustrated in FIGURE 2.

Also included within the assembly is distendible tube 37 which is arranged to provide a vent for liquid and vaporous moisture within the insulating assembly. The tube 37 is preferably made of a material such as polyethylene, and filled with a liquid mass such as water, or a mass of adjustable density, such as a mixture of water and vermiculite. The tube 37 extends through a suitable notch provided in the support blocks 22. These vents and methods for their manufacture are more completely disclosed in U.S. application Serial No. 786,169, filed January 12, 1959, now U.S. Patent No. 3,045,708, owned by the assignee of the present application.

Then, the monolithic embedment is poured into the form provided by the casing 26 to provide a monolithic embedment 38 about the pipes 23 and 24. For the insulating material, we prefer to employ a lightweight, thermally insulating concrete composition made with Portland cement and a lightweight aggregate such as vermiculite, together with suitable integral waterproofing agents such as calcium sterarate, powdered air floated pitch, or commerically available asphalt emulsion. A typical composition may be prepared by combining one bag of Portland cement weighing 94 pounds with 8 cubic feet of expanded vermiculite having a particle size of minus 10 to plus 65 mesh, 7 quarts of an asphalt emulsion prepared by mixing approximately 55 parts by weight of 50–60 penetration asphalt from California crude petroleum with about 43.35 parts hot water containing substantially 0.15 part of caustic soda, and 26 gallons of water. The asphalt emulsion may be treated to convert the emulsion to the slow breaking mixing type by incorporating therein about 1.5 parts of a saponified "Vinsol" resin derived from the extraction of rosin with petroleum solvents.

Alternatively, the thermal insulation may be a heated, compressed mass of a lightweight aggregate coated with a deformable thermoplastic binder. This type of composition is described in Goff Patent No. 2,901,775. Typically, the composition may be expanded vermiculite coated with asphalt and compressed about the pipes until the original volume of the particles is reduced by a value of from 10% to 25% of the original.

After the embedding material has been poured into the form and has been allowed to rigidify, the vent forming tube 37 may be removed by draining their contents and then twisting the tube into a ribbon which can be readily withdrawn. The withdrawal of the forming tube 37 leaves a longitudinally extending vent 41 as best illustrated in FIGURE 3 of the drawings.

The open end of the form is then sealed by providing a curved cover 42 which conforms to the surface of the embedment 38 and is adhesively secured to the sheet 26 by suitable adhesive, such as a mixture of glass fibers and an epoxy resin adhesive. The entire casing is then completely waterproofed and ready for use.

In FIGURE 4, there is illustrated an alternative form of the invention. In this embodiment, a centrally disposed pipe 51 is completely surrounded by a monolithic embedment 52 of a thermal insulating composition. The outer, waterproof membrane consists of a lower semi-circular section 53 and an upper semi-circular section 54 bonded together along their area of contact 55 by a suitable adhesive such as a mixture of glass fibers and an epoxy resin. Longitudinally extending vents 56 are also provided, as in the previous embodiment.

Still another form is illustrated in FIGURE 5 of the drawings. This embodiment makes use of a single seam instead of the dual seams of the previous embodiment. In this instance, a pair of pipes 61 and 62 is incased in a monolithic, thermal insulating embedment 63. The outer wrapper consists of a single sheet of the set resin 64 containing reinforcing glass fibers. The ends of the sheet are sealed together as indicated at numeral 66 with a deposit of a suitable adhesive such as the aforementioned mixture of glass fibers and epoxy resin. Longitudinally extending vents 65 are also provided in parallel relationship to the pipes 61 and 62.

In order to provide a pouring hole for receiving the embedment, the outer membrane may be provided with spaced apertures 67 along its length. After the form has been filled with the insulating composition, and set therein, the cut-out section can be replaced and adhesively secured to the sheet, providing a completely integral waterproof structure.

From the foregoing, it will be evident that the pipe insulating assemblies of the present invention provide a completely waterproof, air testable pipe insulating system. It should also be recognized that various modifications can be made to the described embodiment without departing from the scope of the present invention.

We claim as our invention:

1. The method of insulating a pipe assembly which comprises providing a substantially rigid form about said pipe consisting of a water impervious synthetic resin structure, pouring a settable insulating concrete mixture into said form and about said pipe, said form serving as the complete support for said concrete mixture setting the insulating material about said pipe, and sealing said form into an air-tight condition, said form thereafter serving as an air-tight casing.

2. The method of insulating a pipe assembly which comprises providing a substantially rigid form about said pipe consisting of an arcuately shaped structure of a synthetic resin reinforced with glass fiber, said structure having an inner resinous face devoid of glass fibers, pouring a settable instulating concrete mixture into said form against said inner face and about said pipe, said form serving as the complete support for said concrete mixture setting the insulating material about said pipe, and sealing said form into an air-tight condition, said form thereafter serving as an air-tight casing.

3. A method of insulating a pipe assembly which comprises providing an open ended substantially rigid form about said pipe consisting of an arcuately shaped structure of a synthetic resin reinforced with glass fibers, said structure having an inner resinous face devoid of glass fibers, pouring a wet insulating concrete mix into said form against said inner face and about said pipe, said form serving as the complete support for said concrete mix, and thereafter closing the open end of said form by adhesively securing to the open end an air-tight membrane consisting of a synthetic resin reinforced with glass fibers, said form thereafter serving as an air-tight casing.

References Cited by the Examiner

UNITED STATES PATENTS

| | | | |
|---|---|---|---|
| 1,646,388 | 10/1927 | Bullard | 138—153 |
| 1,792,855 | 2/1931 | McRae | 138—105 XR |
| 1,991,455 | 2/1935 | Gottwald | 138—48 |
| 2,007,969 | 7/1935 | Grodsky | 138 |
| 2,081,867 | 5/1937 | Gysling | 138—145 |
| 2,120,309 | 6/1938 | Carson | 138—145 |
| 2,224,419 | 12/1940 | Whitman | 25—154 |
| 2,321,277 | 6/1943 | Boyle | 25—154 |
| 2,355,966 | 8/1944 | Goff | 138—106 |
| 2,456,400 | 12/1948 | Giannopulos | 138—106 |
| 2,650,184 | 8/1953 | Biefeld | 117—76 |
| 2,691,694 | 10/1954 | Young | 138 |
| 2,740,162 | 4/1956 | Knight | 264—338 XR |
| 2,773,512 | 12/1956 | Burk | 138—149 XR |
| 2,824,033 | 2/1958 | Donaldson | 138—76 |
| 2,850,890 | 9/1958 | Rubenstein | 138—17 |
| 2,855,021 | 10/1958 | Hoppe | 264—45 XR |
| 2,870,793 | 1/1959 | Bailey | 138—141 |
| 2,880,116 | 3/1959 | Alps et al. | 117—76 |
| 2,894,538 | 7/1959 | Wilson | 138—64 |
| 2,901,775 | 9/1959 | Goff | 138—68 |
| 2,906,294 | 9/1959 | Peterson | 264—45 XR |
| 2,933,917 | 4/1960 | Sampson | 138—149 XR |
| 2,962,052 | 11/1960 | Sergovic | 138—141 XR |
| 2,997,071 | 8/1961 | May | 138—145 XR |
| 3,093,160 | 6/1963 | Boggs | 117—126 |

FOREIGN PATENTS

| | | |
|---|---|---|
| 814,289 | 3/1937 | France. |
| 761,208 | 11/1956 | Great Britain. |

OTHER REFERENCES

Dombrow, Bernard A., Polyurethanes, N.Y., Reinhold, 1957 (Reinhold Plastics Applications Series), pp. 68–72.

ALEXANDER H. BRODMERKEL, *Primary Examiner.*

LEWIS J. LENNY, EDWARD V. BENHAM,
*Examiners.*